United States Patent
Tavernier

(10) Patent No.: US 10,706,450 B1
(45) Date of Patent: Jul. 7, 2020

(54) ARTIFICIAL INTELLIGENCE SYSTEM FOR GENERATING INTENT-AWARE RECOMMENDATIONS

(71) Applicant: Amazon Technologies, Inc., Seattle, WA (US)

(72) Inventor: Jean Joseph Tavernier, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 76 days.

(21) Appl. No.: 15/896,775

(22) Filed: Feb. 14, 2018

(51) Int. Cl.
*G06Q 30/00* (2012.01)
*G06Q 30/06* (2012.01)
*G06N 20/00* (2019.01)
*G06F 16/9535* (2019.01)

(52) U.S. Cl.
CPC ..... *G06Q 30/0625* (2013.01); *G06F 16/9535* (2019.01); *G06N 20/00* (2019.01); *G06Q 30/0641* (2013.01)

(58) Field of Classification Search
CPC .................................. G06Q 30/0601–0645
USPC ................................................ 705/26.2–27.2
See application file for complete search history.

(56) References Cited

U.S. PATENT DOCUMENTS

| | | | |
|---|---|---|---|
| 5,421,729 A | 6/1995 | Kutin | |
| 7,970,664 B2 | 6/2011 | Linden | |
| 8,112,429 B2 | 2/2012 | Vadon | |
| 8,595,084 B2 | 11/2013 | Mohan | |
| 8,612,306 B1 | 12/2013 | Mukherjee et al. | |
| 8,631,029 B1* | 1/2014 | Amacker | G06F 3/0482 707/766 |
| 8,738,733 B1 | 5/2014 | Walters et al. | |
| 8,949,107 B1 | 2/2015 | Bhagat et al. | |
| 9,454,581 B1 | 9/2016 | Garg et al. | |
| 9,842,162 B1 | 12/2017 | Hotchkies et al. | |
| 10,181,146 B1 | 1/2019 | Vora | |
| 2002/0077930 A1 | 6/2002 | Trubey et al. | |
| 2003/0167234 A1 | 9/2003 | Bodmer et al. | |
| 2004/0010489 A1 | 1/2004 | Rio | |
| 2005/0102201 A1 | 5/2005 | Linker et al. | |
| 2005/0240472 A1 | 10/2005 | Postrel | |

(Continued)

FOREIGN PATENT DOCUMENTS

CN         104598236         6/2015

OTHER PUBLICATIONS

Aksoy, Lerzan Muhsine. "The Impact of Ordered Alternative Lists on Decision Quality in Online Shopping Environments: The Role of Perceived Similarity." Order No. 3031794 the University of North Carolina at Chapel Hill, 2001. Ann Arbor: ProQuest. Web. Jan. 10, 2020. (Year: 2001).*

*Primary Examiner* — Resha Desai
*Assistant Examiner* — Kennedy Gibson-Wynn
(74) *Attorney, Agent, or Firm* — Knobbe, Martens, Olson & Bear, LLP

(57) ABSTRACT

The present disclosure is directed to training and using machine learning models to determine user intent from a search query, for example via a semantic parse that identifies particular catalog fields for items in an electronic catalog that would satisfy the user's current mission as reflected in their search query intent. The determined intent can then be used to filter recommendations and/or pre-select attribute-value input fields on detail pages displayed after the user navigates away from the search results page, until the mission is complete.

17 Claims, 7 Drawing Sheets

(56) References Cited

U.S. PATENT DOCUMENTS

| | | |
|---|---|---|
| 2006/0206394 A1 | 9/2006 | Brown et al. |
| 2007/0124216 A1 | 5/2007 | Lucas |
| 2008/0120072 A1 | 5/2008 | Bartz |
| 2009/0043674 A1 | 2/2009 | Minsky et al. |
| 2009/0043813 A1 | 2/2009 | Moore et al. |
| 2010/0125504 A1 | 5/2010 | Agha |
| 2010/0138320 A1 | 6/2010 | Gavarini |
| 2011/0004509 A1 | 1/2011 | Wu et al. |
| 2011/0125739 A1 | 5/2011 | Wexler et al. |
| 2011/0196690 A1 | 8/2011 | Peles et al. |
| 2013/0227479 A1 | 8/2013 | Ramsey et al. |
| 2014/0324626 A1* | 10/2014 | Klink ............... G06Q 30/0631 705/26.8 |
| 2015/0058173 A1 | 2/2015 | Schmeling et al. |
| 2015/0310526 A1* | 10/2015 | Warren ............. G06Q 30/0625 |
| 2015/0379738 A1 | 12/2015 | Gunningham et al. |
| 2016/0092951 A1 | 3/2016 | Raman et al. |
| 2016/0150009 A1 | 5/2016 | LeRoy et al. |
| 2016/0180389 A1 | 6/2016 | Kotas |
| 2016/0232558 A1 | 8/2016 | Postrel |
| 2016/0232601 A1 | 8/2016 | Masuko et al. |
| 2017/0116341 A1 | 4/2017 | Wenger et al. |
| 2017/0329820 A1 | 11/2017 | Park et al. |
| 2017/0344615 A1* | 11/2017 | Islam ............... G06Q 30/0625 |
| 2018/0052884 A1* | 2/2018 | Kale ....................... G06N 5/04 |
| 2018/0121945 A1 | 5/2018 | Shiffert et al. |
| 2018/0144385 A1* | 5/2018 | Subramanya ...... G06Q 30/0627 |
| 2018/0218430 A1 | 8/2018 | Prendki |
| 2018/0218431 A1* | 8/2018 | Prendki ................. G06Q 30/02 705/26.7 |
| 2018/0342003 A1* | 11/2018 | Siddiqui ............ G06Q 30/0601 |
| 2019/0068527 A1 | 1/2019 | Chen et al. |
| 2019/0130273 A1* | 5/2019 | Keskar ................... G06N 3/084 |
| 2019/0236681 A1* | 8/2019 | Konik ................... G06Q 30/06 |

\* cited by examiner

ARTIFICIAL INTELLIGENCE SYSTEM FOR GENERATING INTENT-AWARE RECOMMENDATIONS

BACKGROUND

Some web sites and other types of interactive systems implement services for generating customized content suggestions for items stored or represented in a data repository. One common application for such services involves suggesting products for purchase, rental, subscription, viewing, or some other form of consumption. For example, some e-commerce web sites provide services for suggesting products to users based on their respective purchase histories, rental histories, product viewing histories, item ratings, and/or other behaviors. Such services are also used to suggest web sites, news articles, users, music and video files, and other types of items.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
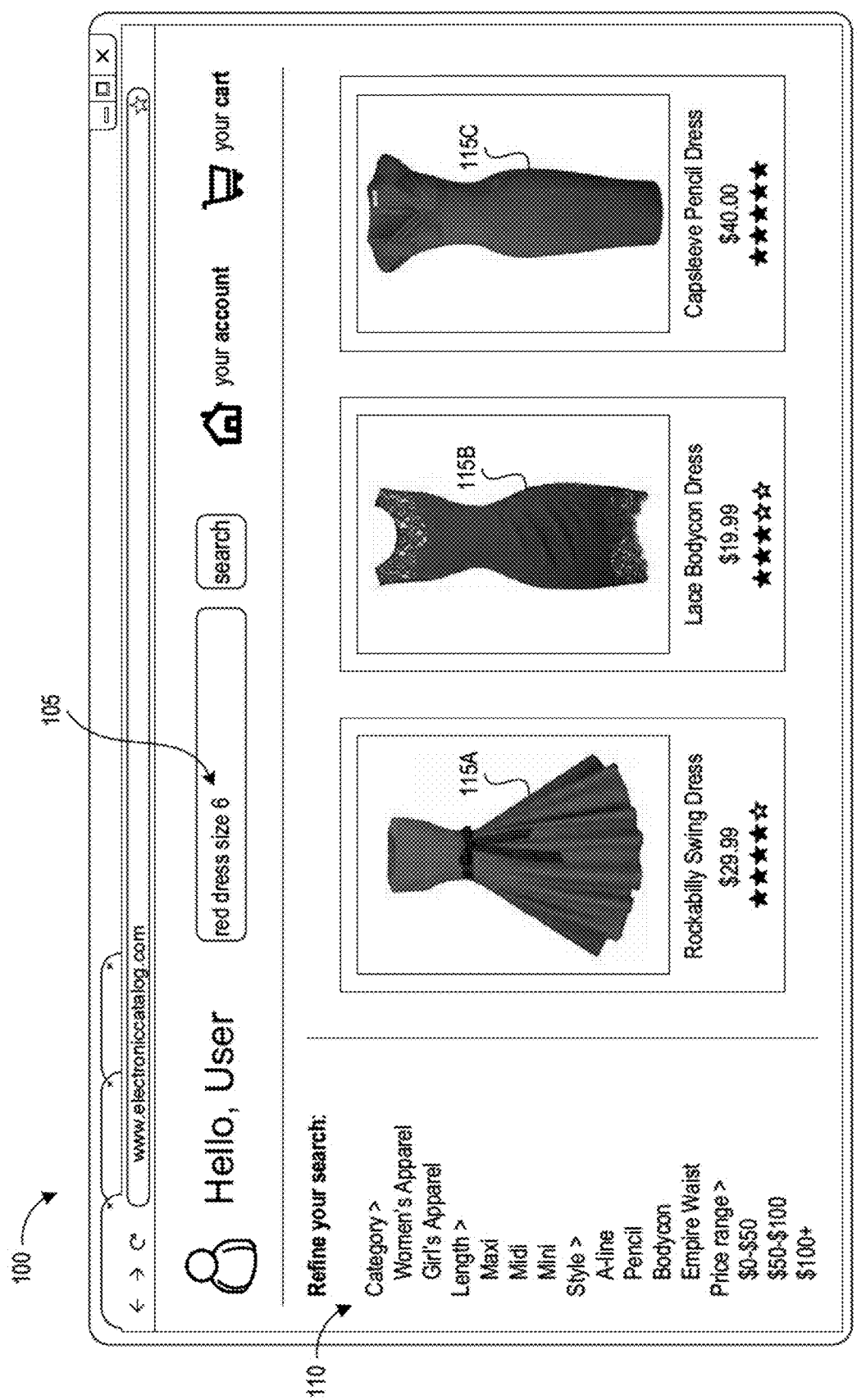
FIG. 1A depicts an example graphical user interface providing search results related to a search query.

The present disclosure is directed to a machine learning-based artificial intelligence system that analyzes search queries to understand user intent, for example during an online shopping session or network-based search and browsing session, and then customizes the content of subsequently-displayed user interfaces to match the determined intent. More specifically, the present disclosure relates to a system that autolabels natural language search queries with attributes such as electronic catalog fields and uses these to define a "mission" or "intent" of the user. The system then uses these labeled search queries, as collected over a population of users and sessions, to train a machine learning model to predict user intent from new input search queries. Thus, when a new search is submitted by a user, the machine learning system can identify the user's intent and customize subsequently displayed recommended content to align with their browsing mission.

In existing systems, the mission expressed through a search is not formally identified, and keywords of the search are typically only utilized for displaying results in response to the search. For example, a user may select an item returned in a search result to be presented with its item detail page (also referred to herein as a "catalog page"). The recommendations presented on an item detail page located by submitting a search query for "red dress" may include black or other colored dresses, because such recommendations are typically based on the item of the detail page and not on any aspects of the previous search that led the user to the page. In cases where the user was not able to complete their purchase, the catalog homepage may remind the user of their "mission" generally to purchase a dress on their next visit, again using black dresses. Similarly, results displayed after a search often are not an exact match for the user's intent; searching for "men's golf shoes size 10" typically results in a display of shoes available in a variety of sizes. After selecting to view the detail page of one of the search result items, the user still is required to select the right size from a size drop down menu or other size input field, despite already having searched for it. Accordingly, the user intent inherent in the search terms is lost after the user navigates away from the search result page.

The present disclosure addresses the aforementioned problems, among others, by using machine learning to identify user intent reflected in a given search query, and then consistently persisting that intent through a series of subsequently-displayed pages until, for example, the goal of the intent (the "mission") is complete. Beneficially, this can reduce or eliminate repetitive user action or selection of user interface elements such as drop-down menus and the like. The disclosed techniques also result in more immediate presentation of relevant results throughout the "mission." Further, the disclosed techniques avoid presenting items (and detail pages for items) that are not relevant to a search, reducing load on the system by eliminating the unnecessary download of information that is not relevant for the user.

For example, in the context of an electronic catalog of items (e.g., products or services), the disclosed machine learning systems can autolabel search queries with catalog fields in a hierarchical catalog structure. These catalog fields can represent the inferred "intent" behind the query. As used herein, "intent" refers to a purpose or information need, such as the seeking of a particular item or type of item. Thus, the intent can be used to construct a "mission" of the user—that is, to identify a specific item type that, once acquired, would have satisfied the goal of the initial search query. In some embodiments, a mission can be identified using the systems and techniques disclosed in U.S. application Ser. No. 14/665,984, filed Mar. 23, 2015 and entitled "CLUSTERING INTERACTIONS FOR USER MISSIONS," and U.S. application Ser. No. 14/666,134, filed Mar. 23, 2015 and entitled "CLUSTERING INTERACTIONS FOR USER MISSIONS," the contents of which are hereby incorporated by reference for all purposes. The terms "autolabel," "autolabeling," and "autolabeled" as used herein refer to the labeling of queries with corresponding catalog fields using machine learning techniques without human oversight (e.g., without manual labeling where a human user associates a query with a catalog field). Autolabeling can include, e.g., the generation of a table that maps queries to the unique identifiers of different catalog fields. Autlabeling can be supplemented by manual labeling in some implementations.

To illustrate, FIG. 1A illustrates an example user interface 100 displaying search results 115A-115C returned in response to a search query 105. Although the present example focuses on a graphical user interface, the disclosed techniques can be applied to audibly presented item listings, for example items described using synthesized speech via a home assistant device. As illustrated, the search query 105 is a natural language string of "red dress size 6." In response to this query 105, the disclosed machine learning system can use natural language processing to identify that the user intent of viewing items of item-type=dress, attribute color=red, and attribute size=6. These attribute-value pairs may each be represented by a different catalog field, such that the terms in the query are grounded to their meaning within the electronic catalog. These identified catalog fields reflect that the user has a shopping mission of buying a specific type of item (here, a dress) of a specific color (here, red) and a specific size (here, 6). Although the user intent (in terms of attribute-value pairs) in this running example may be readily apparent, in many cases it is not. For example, in the context of the electronic catalog, the ambiguous term "bush" in the query "bush book" may refer to vegetation or shrubbery of moderate height, or to the last name of former Presidents of the United States. Thus, as described below, the disclosed system preferably mines large quantities of collected behavioral data (including search submissions and associated item selection actions of users) for purposes of building a model that can accurately predict or infer the intent associated with a search query. This concept of "intent" grounds the terms of the search query within the context of the electronic catalog to give them meaning with respect to the particular types of items that would satisfy the user's mission.

According to the present disclosure, the displayed search results 115A-115C (and any others viewable by scrolling or pagination) each comports with the identified shopping mission. Although the user interface images have been converted to greyscale for purposes of patent drawing illustrations, it will be appreciated that the original images depicted items 115A-115C as red dresses. Here, the three items 115A-115C are all dresses, available in the color red, and available in size six. For example the system can use using item-availability data to identify the search result set as items available in (size=6) and (color=red). Beneficially, by detecting the user intent to purchase a dress specifically in "size 6", the disclosed systems can prevent displaying search results that do not actually match the user's intent (e.g., a red dress only available in size 10). Instead, the disclosed systems can present more helpful sets of items that are focused on the user's intent.

In some implementations, the machine learning system can adjust the determined mission based, for example, on additional user searches (e.g., "red dress size 6 under $50"), user interactions with search refinements 110 (e.g., selecting the $0-$50 price range), and/or patterns of user interactions with the search results (e.g., only viewing detail pages of items that are less than $50, or viewing greater than a certain threshold number or percentage of detail pages of items that are less than $50).

Figure 1B:
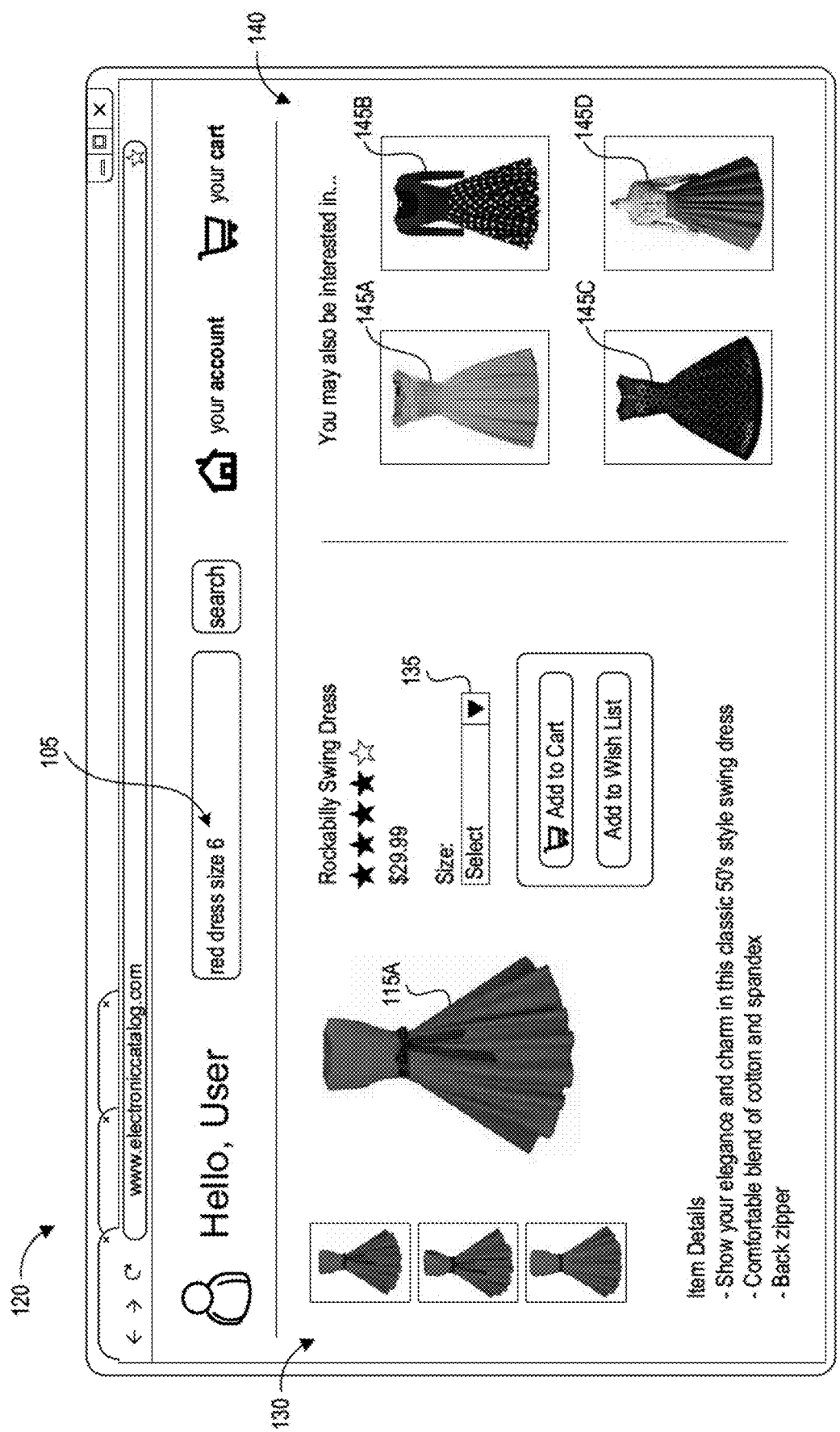
FIG. 1B depicts an example prior art graphical user interface providing an item detail page for an item of the search results of FIG. 1A.

FIG. 1B depicts an example graphical user interface 120 providing an item detail page for item 115A of the search results of FIG. 1A, with the example detail page generated according to existing practices. Such a page can be presented, for example, when the user selects a user-selectable link to the page (for example, the photo of the item 115A or a link in the item title) from the search results page 100. The detail page includes a section 130 displaying information about the item 115A, a selectable menu 135 to select a size for the item, and user-selectable buttons to add the item 115A to a digital shopping cart or wish list. The detail page also includes a section 140 for displaying recommended items 145A-145D. The set of recommended items may be selected programmatically based on user-behavior-based item associations, as described in U.S. Pat. No. 6,912,505, the disclosure of which is hereby incorporated by reference. As illustrated, according to existing approaches the selectable menu 135 is in its default state (e.g., a "select" prompt). While the item 145D represents a red dress, three of the recommended items 145A-145C are not of the color red (in the original images, item 145A is light blue, item 145B is navy blue, and item 145C is black). Thus, using existing systems, the intent of the query 105 is lost in the transition to the item detail page 120. As such, even though the user already provided their desired value for the size attribute (value=6), they must select this value from the menu 135.

Further, the recommended items 145A-145C do not align with the user's intent and thus are likely not relevant recommendations. In existing systems, such recommended items are typically determined based on other items commonly viewed together (e.g., during the same browsing session) with the item 115A and/or other items commonly purchased together (e.g., in the same order or within a certain interval of time). These are referred to respectively as "view-based similarities" and "purchase-based similarities." Another technique for identifying such recommendation sets includes identification of complementary items, for example a set of accessories and other apparel items commonly purchased with the dress 115A. These previous recommendation approaches do not account for the intent or mission of the user as reflected by the search query 105 that led the user to this page.

Figure 1C:
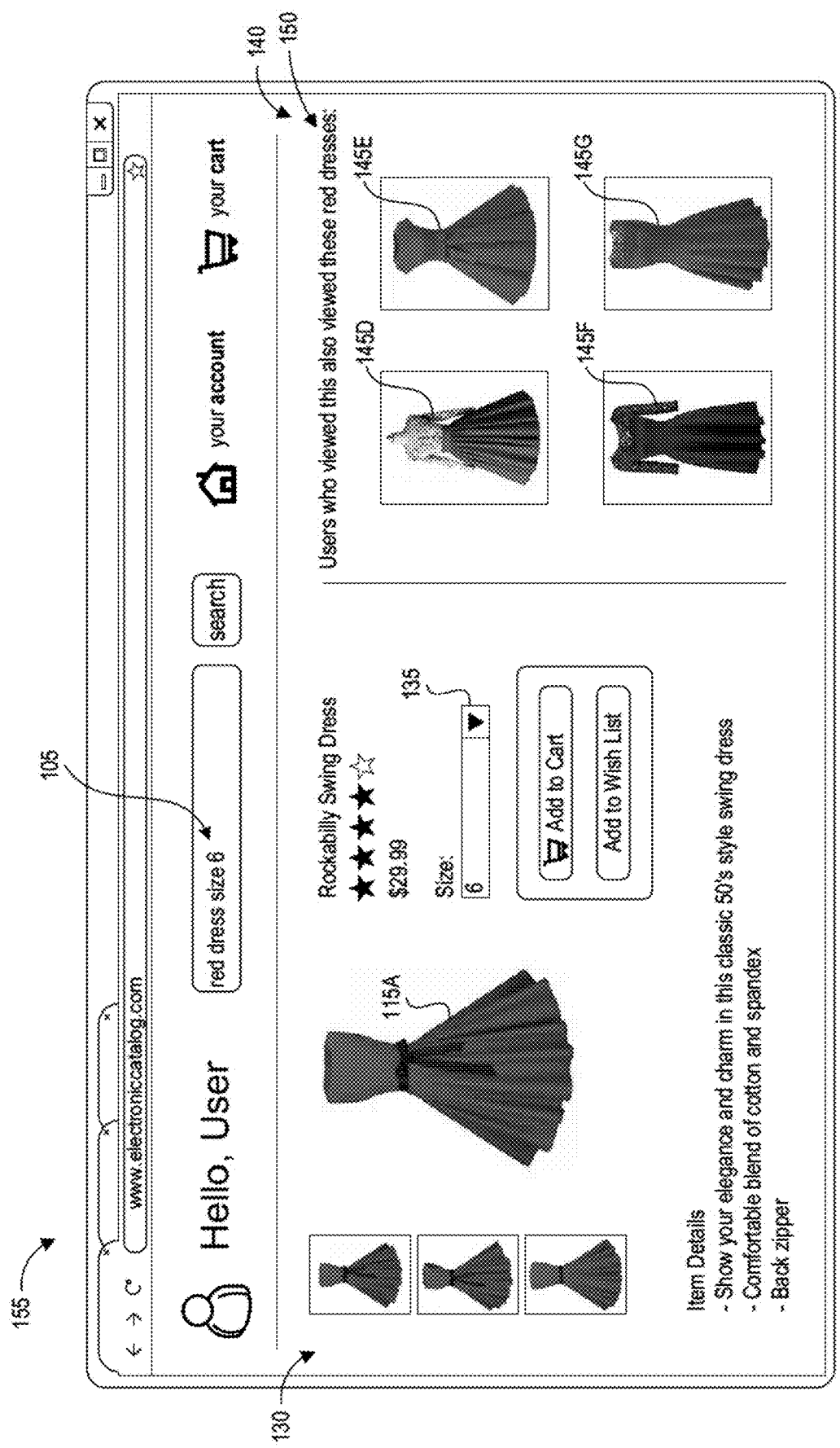
FIG. 1C depicts an example graphical user interface providing an item detail page for an item of the search results of FIG. 1A according to the present disclosure.

FIG. 1C depicts an example graphical user interface 155 providing an item detail page for item 115A of the search results of FIG. 1A, with the user interface 155 generated according to the present disclosure. In contrast to the user interface 120, the intent and mission of the search query 105 have been used to shape the content of the user interface 155. For example, size 6 is pre-selected in the selectable menu 135 based on the inclusion of the attribute-value pair (attribute=size, value=6) in the search query 105. The selectable menu 135 is one example of a user-editable field that allows a user to input or select a particular value for a particular item attribute. Further, recommended items 145A-145C that do not pertain to the identified intent and mission are omitted from the user interface 155 and replaced with pertinent items 145E-145G. Each of the items 145E-145G is a red dress that also reflects the intent of buying an item in size 6. The user interface 155 also includes an indication 150 regarding why these particular items are displayed that ties the recommendations back to the user's own language of the search. Here, the indication 150 reads "Users who viewed this also viewed these red dresses" to show the user that the system's perception of their intent by tying the indication to the particular "red dress" language used in the search query 105. In one example, the disclosed systems can filter the recommendation set used to generate the user interface 120 described above to only include items that match the catalog fields identified as corresponding to the search intent. This includes using item-attribute data to exclude any dresses that do not match the catalog field (color=red), as well as using item-availability data to exclude any dresses that are not available in (size=6).

Further, the disclosed techniques can use attribute metadata associated with images of the items 145D-145G to select an appropriate image for display in the section 140 for displaying recommended items. To illustrate, the dress 145E may be available in black, red, blue, and white, and the electronic catalog can store a photo depicting the dress in each of these colors. Each photo may be associated with metadata indicating attribute-value pairs or catalog fields reflected in the photo, such as (color=black) or (color=red). The system can select the photo having the attribute-value pair that matches the search query 105, here choosing the image that depicts the dress 145E in the red color option.

If the user selects to view the detail page for one of the recommended items 145D-145G, the disclosed system can continue to deliver user interfaces that comport with the intent of the search query 105. For example, a detail page for the item 145E may include a pre-selected size 6 and pre-selected color red, and recommended items on that detail page may include red dresses available in size 6. This can continue in some examples until the identified mission has been completed (for example by the user acquiring a red dress) or abandoned (for example, by the user conducting an unrelated search or ending the current browsing session). Acquiring can refer to the user purchasing the dress or adding the dress to the digital shopping cart. In some embodiments, the mission may conclude when the user performs some other activity indicating they have found the desired item that prompted the search query 105, for example adding the dress to a wish list or registry, or sharing the dress with another user, on social media, or via electronic messaging. In this manner, the disclosed technology beneficially facilitates successful completion of missions by users, by providing a stream of user interfaces that remain consistent with respect to the intent expressed via the search query 105 or a set of related search queries.

In some cases, the user may terminate their browsing session without completing the mission. The system may remind the user of their mission the next time they log in to the electronic catalog, for example by displaying a prompt "Are you still looking for a red dress in size 6?" together with items that comport with the detected mission. The system may also send the user recommendations of items that comport with the mission via an electronic message, for example with an indication "Check out these fabulous red dresses in size 6!" These indications and recommendations can aid the user in completing the mission, as well as convey to the user how their intent was understood.

The present disclosure provides certain examples of search queries and associated items. These are intended to illustrate and not limit the scope of the disclosed intent-aware user interface generation techniques. Although examples in the present disclosure focus on the context of digital shopping via an electronic catalog, the disclosed machine learning system can be used to customize browsing experiences outside of the context of an electronic catalog. For example, the disclosed techniques may be useful for identifying news articles, educational resources, web pages/domains, and other digital content that is likely to align with a network browsing mission of a particular user as reflected in the intent of a search query. The disclosed methods can also be used to identify user missions for restaurants (or specific dishes or types of food), television shows, real estate listings, movies, music, events (e.g., concerts), vacation packages, and various other types of items, and to customize user interfaces to facilitate completion of such missions by the user, for example by providing advertisements relevant to the determined mission as the user continues their browsing experience. As such, the disclosed techniques are not limited to predicting items of interest for a shopping mission of an electronic catalog user, and are applicable in a variety of contexts. Further, the disclosed identification of intents and missions can be used to build profiles representing interests of particular users, for example based on catalog fields that significantly co-occur across search queries submitted by a particular user. This personalized intent analysis can be used, for example, to determine that when user A searches for "running shoes" he really means "men's running shoes size 11," while when user B searches for "running shoes" she really means "women's running shoes size 8."

The task of navigating a large electronic catalog of items (e.g., a catalog with over one thousand items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

Recommendation algorithms and user interfaces of the type disclosed herein significantly reduce this problem, allowing users to locate items of interest with fewer steps. For example, in the embodiments described herein, when the user is presented with one or more item recommendations, each item recommendation includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages in order to locate the recommended items via the browse tree or via searching. This can be particularly true for computing devices with small screens, where fewer items can be displayed to the user at a time and thus navigation of larger volumes of items is more difficult.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Intent-Aware Machine Learning Processes

Figure 2A:
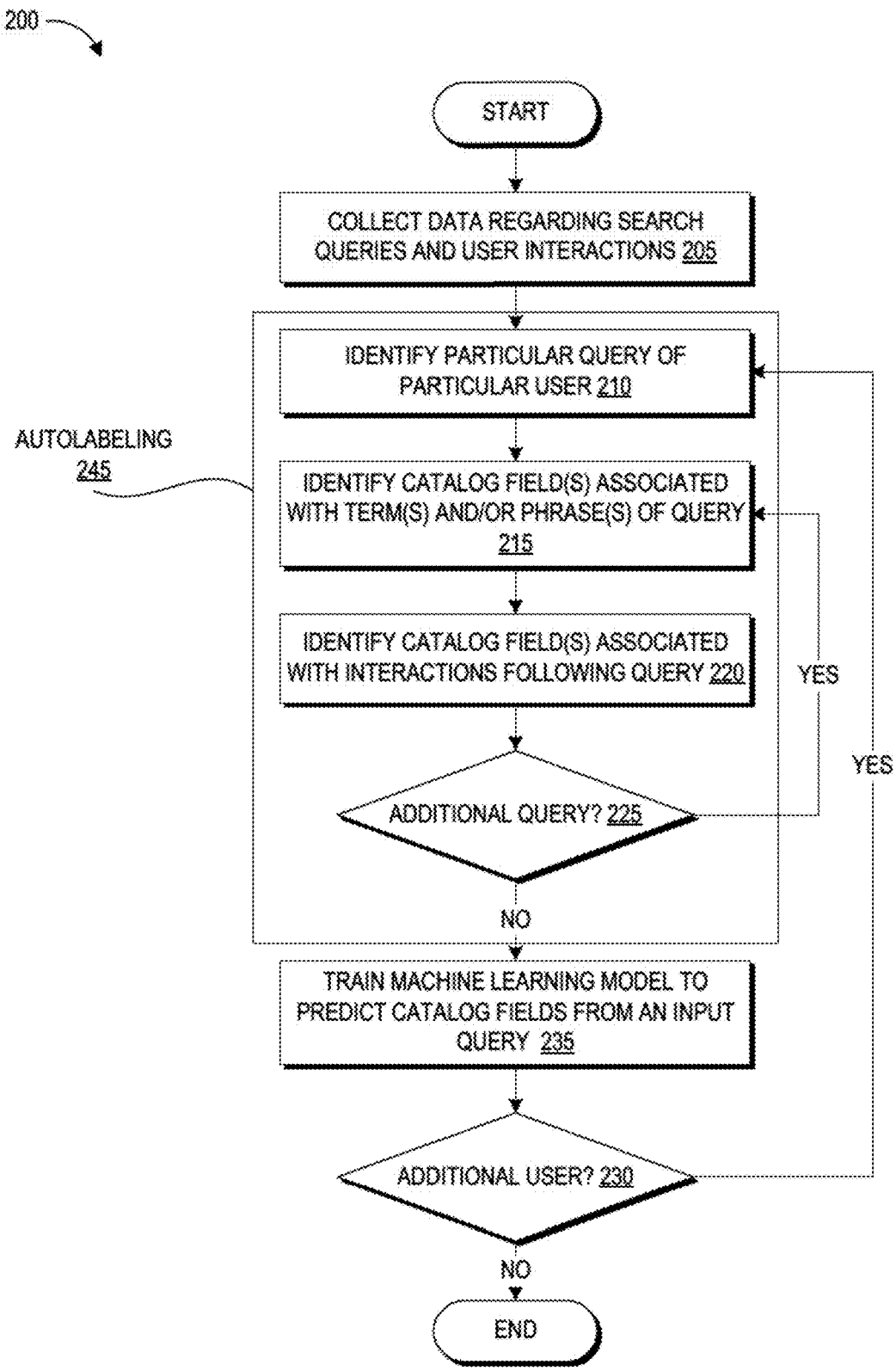
FIG. 2A depicts a flowchart of an example method for using machine learning to identify user intent reflected in search queries, for example the query of FIGS. 1A-1C.

FIG. 2A depicts a flowchart of an example process 200 for using machine learning to identify user intent in search queries, for example the query 105 of FIGS. 1A-1C. The process 200 can be implemented by components of the computing system 400 described below, or another suitable computing system. As described further below, the process 200 may be executed periodically (e.g., once per day) or intermittently (e.g., upon collection of a certain quantity of new training data) in an offline mode.

The process 200 may begin in response to an event, such as on a predetermined or dynamically determined schedule, on demand when initiated by a system administer, or in response to some other event. For example, the process 200 may be executed in an offline mode periodically, for example once per day, month, or in response to some other timing specification. When the process 200 is initiated, a set of executable program instructions stored on one or more non-transitory computer-readable media (e.g., hard drive, flash memory, removable media, etc.) may be loaded into memory (e.g., random access memory or "RAM") of a server or other computing device. The executable instructions may then be executed by a hardware-based computer processor (e.g., a central processing unit or "CPU") of the computing device. In some embodiments, the process 200 or portions thereof may be implemented on multiple computing devices and/or multiple processors, serially or in parallel.

At block 205, the process 200 collects data regarding search queries and associated user interactions. In some embodiments, the interactions may include or be limited to items purchased from the displayed search results, as this is a strong positive signal that the item satisfied the mission of the user. In other embodiments, the interactions can additionally or alternatively include shopping cart adds that do not result in a purchase, search refinements, further related (possibly more specific) queries, and interaction with displayed search results (e.g., clickstreams (viewing a sequence of detail pages), streaming digital media search results). These actions are also considered as a positive vote by the user that the item satisfies their search query. Although purchases may indicate the strongest positive vote, an example electronic catalog may see around 200 million clicks per day but only a million purchases. Thus, including other positive votes can expand the volume of data available for training machine learning models. A data repository can store search queries and the interaction sets associated with such queries, and each interaction can be associated with one or more catalog fields. This data repository can be maintained with user-specific queries and interactions and/or aggregate queries and interactions from a number of users.

The process 200 then transitions into the autolabeling stage 245, beginning at block 210. As used herein "autolabeling" refers to the programmatic labeling of data for training a machine learning model without requiring human oversight. Beneficially, this enables the process 200 to generate large quantities of training data automatically based on logged user behaviors. At block 210, the machine learning system identifies a particular query of a particular user to autolabel.

Figure 2B:
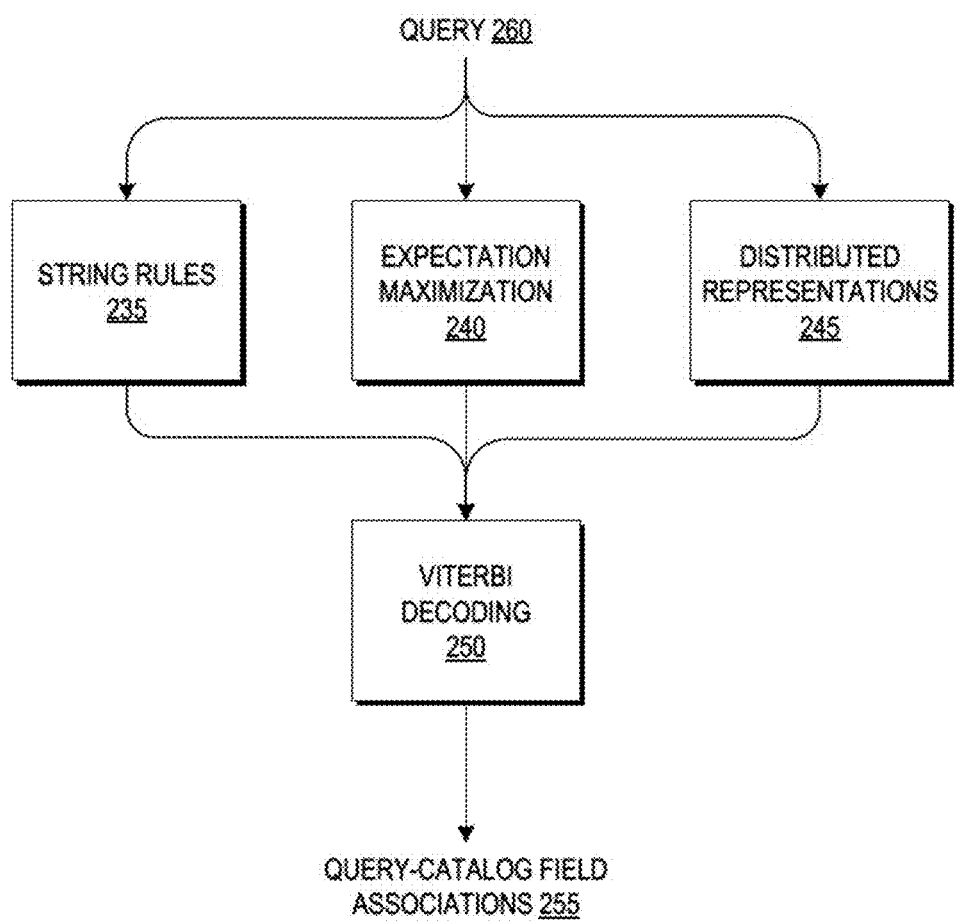
FIG. 2B depicts an example machine learning system that can be used to identify query to catalog field associations in the process of FIG. 2A.

At block 215, the machine learning system uses one or more algorithms to identify which catalog fields are represented by the query. For example, with reference to FIG. 2B, the machine learning system can use one or more of several different algorithms to provide inputs into the Viterbi decoding algorithm 250 in order to identify the query-catalog field associations 255. The modules shown in FIG. 2B can be stored as sets of computer-executable instructions in a computer-readable memory, which can be executed by a hardware processor to perform the described functions.

In order to discover the query-catalog field associations 255, one or more of string rules 270, associations learned from expectation maximization 240, and distributed representations 265 can be used to analyze the search query 260 and provide potential catalog fields as inputs into the Viterbi decoding algorithm 250. The string rules 270 can specify catalog fields that correspond to the exact terms (or phrases) in the query 260 and to their common misspellings. For example, the string rules 270 can specify that "dress" and "dres" correspond to the catalog field for dresses. Misspellings can be determined based on edit distance (e.g., sum of penalties from swap, insert, and delete operations) and/or based on Jaccard similarity. The expectation maximization module 240 allows the machine learning system to find arbitrary associations between query terms and catalog fields (e.g., a query term of "odorless" corresponds to the catalog field of "fragrance-free", a query term of "CK" corresponds to the catalog field for the brand "Calvin Klein") even in the absence of literal keyword matching between the terms and catalog fields. Expectation maximization can be useful for discovering associations between synonyms or acronyms of words in a catalog field and the corresponding catalog field, and can be performed as a patch process to discover these associations. The distributed representations 265 can learn vector embeddings of words in search queries, for example from a corpus of terms of the electronic catalog (e.g., terms in item descriptions, reviews, question and answer sections, and the like). This can be used to represent each word in the search query as a vector for input into the Viterbi decoding algorithm 250, where such vectors capture similarity between words using proximity in the vector feature space.

The Viterbi decoding algorithm 250 is a dynamic programming algorithm for finding the most likely sequence of hidden states—called the Viterbi path—that results in a sequence of observed events, especially in the context of Markov information sources and hidden Markov models. This results in a form of "distant supervision," in that the machine learning system is given query/interaction data and uses associated attributes of the interacted product to auto-label query. In some examples, this association between queries and attribute-value(s) can be personalized to understand the specific intent of a particular user using a particular term in a search query. To illustrate, consider that a particular user previously searched for "dress" a number of times and almost always purchased A-line dresses. This is an implicit indication that when this user searches "dress" she specifically means A-line dresses, so her search queries for dress can be associated with the attribute-value pair of (dress style=A-line).

In one example, the Viterbi decoding algorithm 250 can use a single pass when decoding to learn emission probabilities. In another example, the Viterbi decoding algorithm 250 can use an iterative process where transition probabilities and emission probabilities are learned over time, for example using the forward-backward algorithm. Transition probabilities represent the probability of transitioning between particular states, while emission probabilities represent the probability of making certain observations from particular states.

At block 220, the machine learning system used identifies which catalog fields are represented by the interactions following the query. For example, the data may include pre-identified associations between queries and the catalog fields of items purchased after making those queries. In other examples, the machine learning system can identify a purchase within the interactions following the query and then identify, from item data, which catalog fields are associated with the purchased item. Other examples can use non-purchase type interactions, for example item detail page views, item wishlist or registry adds, search refinements, and the like. The catalog fields of the query and the interactions can be stored in association with the query for later machine learning model training.

At block 225, the process 200 determines whether there are any other queries or query clusters to autolabel for the particular user. If so, the process 200 loops back to block 215 through the autolabeling stage 245 until all queries made by the particular user have been autolabeled.

Some implementations can supplement the autolabeling stage 245 with some manual labeling for queries, for example for terms that cannot be autolabeled to a particular catalog field. As an illustration, in the query "best vacuum cleaner" the phrase "vacuum cleaner" can be grounded to a catalog field, however "best" cannot. "Best" may be labeled as a type of ranking (rank-type) and then leveraged for sorting items in the search results, for example based on user reviews or ratings. This can be implemented as a hand-coded rule that identifies the rank-type word in the query and then identifies a ranking technique based on the rank-type word.

After completing the autolabeling stage 245, the process 200 transitions to block 230. At block 230, the machine learning system trains one or more machine learning models to predict catalog fields from input queries. This can be considered as a form of translation, as words, phrases, and semantic content of the search query are translated into one or more catalog fields, with the catalog fields representing specific types of items in the catalog. In one example, a first machine learning model (e.g., a sequence-to-sequence model or transformer network) learns to perform a semantic parse to identify different portions of the query, to label these portions, and to ground the labeled portions to catalog fields. Training this model includes using the autolabeled queries as training data, where the query (or a vector representation of the query) is provided to the machine learning model as input and the associated catalog fields (or a vector representation of these catalog fields) are provided to the machine learning model as expected output. Some implementations can apply a decay to training data to give greater weight to the most recent data. The system tunes the internal parameters of the machine learning model to predict the expected output given the input. Once trained, the output of this model can be used to identify the catalog fields, or in other embodiments can be provided to a second machine learning model as candidate catalog fields.

In embodiments using a second machine learning model (e.g., a multilayer perceptron neural network or other suitable linear model), this model can intake the list of potential catalog fields and pick the right option for the particular user. For example, during training the candidate catalog fields from the first machine learning model can be provided as input, and the actual catalog fields corresponding to items purchased after the query can be used as the output. For example, given a query for "running shoes" the second machine learning model may be provided with inputs of all catalog fields corresponding to running shoes, for example men's running shoes, women's running shoes, and kids running shoes. The output can indicate that the particular user has purchased items from the men's running shoes category after searches for "running shoes." Thus, the second machine learning model can learn to pick personalized catalog fields for particular users.

Some embodiments can implement a third machine learning model as an error-checking model or confidence-level-determination model. This model can compare the output of the first or second machine learning models to the catalog fields identified in the autolabeling stage 245 to determine how accurate the output is. If the output does not match, the third machine learning model can indicate to re-train the first and/or second machine learning models. In some embodiments, this model can be a neural network trained using queries as inputs and autolabeled catalog fields as outputs. Another use of such a model can be to provide confidence levels in outputs of the first/second machine learning models in use. This can be used to filter when the output of the first/second models are used to alter user interfaces as described herein, or to give users a signal of the quality of the recommendations, for example as a confidence score. This can be particularly useful for user interfaces of constrained size, such as mobile interfaces or for recommendations presented audibly using, for example, a home assistant device.

Upon completion of training, the trained system of models is stored for use in analyzing future queries submitted by the particular user. The process 200 then moves to block 235 to determine whether there are additional users who have submitted queries for analysis. If so, the process 200 transitions back to block 210, and if not the process 200 ends.

With respect to block 235 of the process 200, one example of a suitable machine learning model includes a sequence to sequence model. Sequence to sequence models address areas such as machine translation, where an input sequence in one language is converted into a sequence in another language. Here, input sequences of query words are converted into a sequence of corresponding catalog fields. The sequence to sequence model can operate on embeddings, so the machine learning system can compile a first "vocabulary" list containing all the words in search queries (or all significant words, perhaps omitting "the," "an," etc.) and a second vocabulary list including the catalog fields associated with the autolabeled queries. The model inputs can be tensors containing the IDs of the words in a search query, and can be "padded" so that all inputs are of the same length. Similarly, the outputs can be tensors containing the IDs of the catalog fields, padded so that all outputs are the same length.

Sequence to sequence models include an encoder step and a decoder step. In the encoder step, an encoder model converts an input sequence (such as a natural language search query) into a fixed representation. The encoder model processes the input sequence and returns its own internal state. This state will serve as the "context", or "conditioning", of the decoder model in the decoder step. In the decoder step, the decoder model is trained on both the output sequence (such as the list of autolabeled catalog fields) as well as the fixed representation from the encoder. In one example, the encoder and decoder models can be recurrent neural networks, a form of artificial neural network that is particularly suitable for sequence analysis. In another example, the encoder and decoder models can be convolutional neural networks. These forms of artificial neural networks are explained in more detail below.

Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. The number of nodes can vary between layers. A neural network is considered "deep" when it includes two or more hidden layers. The nodes in each layer connect to some or all nodes in the subsequent layer and the weights of these connections are typically learnt from data during the training process, for example through backpropagation in which the network parameters are tuned to produce expected outputs given corresponding inputs in labeled training data. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

A recurrent neural network ("RNN") takes each element of a sequence, multiplies the element by a matrix, and then sums the result with the previous output from the network. A convolutional neural network ("CNN") is a type of artificial neural network, and like the artificial neural network described above, a CNN is made up of nodes and has learnable weights. However, the layers of a CNN can have nodes arranged in three dimensions: width, height, and depth. The nodes of a layer may only be locally connected to a small region of the width and height layer before it, called a receptive field. The hidden layer weights can take the form of a two-dimensional or three-dimensional convolutional filter applied to the receptive field. The nodes in each convolutional layer of a CNN can share weights such that the convolutional filter of a given layer is replicated across the entire width and height of the input volume, reducing the overall number of trainable weights and increasing applicability of the CNN to data sets outside of the training data.

Another suitable machine learning model is a transformer network. Machine learning has turned out to be a very useful tool for understanding natural language, but the tendency of models to do their work word by word can lead to errors with respect to ambiguous words. For example, consider the sentences "I arrived at the bank after crossing the street" and "I arrived at the bank after crossing the river." The word "bank" has different meanings in these two sentences, but these differences are only apparent after the last word is read. This type of ambiguity can occur in search queries as well. Processing the example above, an RNN could only determine that "bank" is likely to refer to the bank of a river after reading each word between "bank" and "river" step by step.

Transformer networks address this ambiguity by performing a small, constant number of steps (chosen empirically). In each step, the transformer network applies a self-attention mechanism which directly models relationships between all words in a string, regardless of their respective position. As described above, the sequence to sequence model includes an encoder reading the input string and generating a representation of it, and a decoder that generates the output sequence of catalog fields, ID by ID, while consulting the representation generated by the encoder. The transformer network similarly has an encoder and a decoder. The encoder of the transformer network starts by generating initial representations, or embeddings, for each word. Then, using self-attention, it aggregates information from all of the other words, generating a new representation per word informed by the entire context. This step is then repeated multiple times in parallel for all words, successively generating new representations. The decoder operates similarly, but generates one catalog ID at a time. The decoder attends not only to the other previously generated words, but also to the final representations generated by the encoder.

The process 200 can be performed in an offline mode. As used herein, "offline" or "offline mode" refers to processing operations relating to data and/or calculations that are precomputed, that is, performed in advance of an event that may trigger output of an intent-aware user interface as described herein. For example, the machine learning techniques can be used to autolabel search queries with catalog fields and train machine learning models to predict the catalog fields associated with new queries. These trained machine learning models can then later be used to generate recommendations for users as they interact with the electronic catalog.

Figure 3:
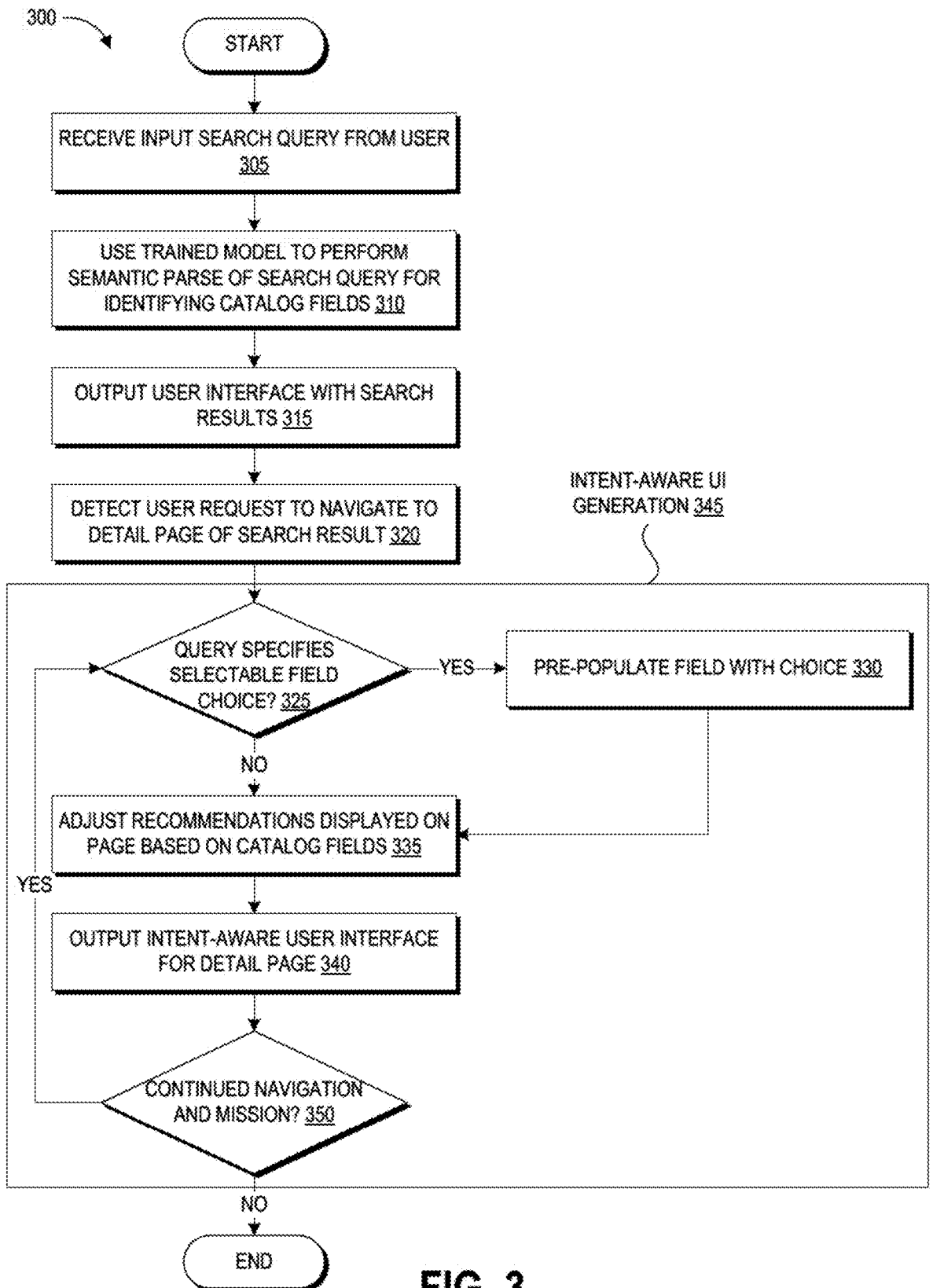
FIG. 3 depicts a flowchart of an example method for using a machine learning model trained according to the process of FIG. 2A to generate a user interface, for example the user interface of FIG. 1C.

FIG. 3 depicts a flowchart of an example process 300 for using a machine learning model trained according to the process 200 to generate a user interface, for example the user interface 155 of FIG. 1C. The process 300 can be implemented by components of the interactive computing system 400 described below. When the process 300 is initiated, a set of executable program instructions stored on one or more non-transitory computer-readable media may be loaded into memory of a server or other computing device. The executable instructions may then be executed by a hardware-based computer processor of the computing device. In some embodiments, the process 300 or portions thereof may be implemented on multiple computing devices and/or multiple processors, serially or in parallel.

At block 305, the process 300 begins in response to receiving an input search query from a user, for example through a search engine of an electronic catalog service. At block 310, the machine learning system performs a semantic parse of the search query to predict the catalog fields that relate to the user's intent, for example a model trained using the process 200. For example, at block 310 the trained model can produce a semantic parse that labels each portion of the query and grounds it to a catalog field. To illustrate, given query of "red dress," the trained model can produce as output the equivalent of "red is a color and it corresponds to browse node ID=123," and "dress is an apparel item and it corresponds to category 234."

Next, at block 315 the catalog service outputs a user interface displaying results of the search. As described herein, these results can be consistent with the intent and mission expressed in the query, for example by being associated with the catalog fields identified at block 310. At block 320, the catalog service detects a user request to navigate to the detail page of one of the search results. In response, the process 300 enters the intent-aware user interface generation stage 345 in which user interfaces displayed after the initial search result user interface are generated such that their content reflects the intent and mission of the user.

At block 325 the machine learning system can determine whether the query specifies a particular value for a particular attribute that is associated with a user-editable field on the detail page. For example, the machine learning system can use natural language processing algorithms or keyword searching to identify a word or phrase in the query corresponding to an attribute-value pair (e.g., "red" for color=red, "size 6" for size=6). Block 325 can also include cross-referencing particular attributes of identified attribute-value pairs in the query with selectable fields available on the requested item detail page. If the answer at block 325 is yes, then at block 330 the catalog service can pre-populate the user-editable attribute field (e.g., a selectable field such as a drop down menu, radio button or checkbox, or a text input field) on the detail page with the value specified in the user's search query.

If the answer at block 325 is no, or after completing block 330, the process transitions to block 335. Alternatively, block 335 can be executed prior to or in parallel with blocks 330 and/or 325. At block 335, the catalog service adjust (e.g., filter or re-rank) recommendations for display on the detail page based on the identified catalog fields. As described above, the recommendations can be obtained based on view-based similarities or purchase-based similarities. U.S. Pat. No. 6,912,505, incorporated by reference above, represents one example of how these recommendations may be generated. A behavior-based item-to-item mapping table may be accessed to look up the items most closely associated (based, e.g., on item views or item purchases) with the user-selected item. These items can then be filtered such that only items that match the catalog fields of the user intent are displayed, or re-ranked such that items that match the catalog fields are surfaced above items that do not (or above items that match only some of the catalog fields). Additionally, the image used to depict the item can be selected based on matching image metadata with catalog fields associated with the query, for example by identifying the correct child-item of a parent-item available in multiple variations.

At block 340, the catalog service outputs the generated intent-aware user interface to the device of the user. At block 350, the catalog service determines whether the user continues their mission and navigation of the catalog, for example by determining that the user has not acquired an item that satisfies the mission. If so, the process loops back to block 325 to persist the determined intent through a series of subsequently-displayed pages until, for example, the goal of the intent (the "mission") is complete. Once the mission is complete and/or the user ceases navigation, the process 300 ends.

As used herein, "online" or "online mode" refers to processing operations performed as a user is currently interacting with a networked system such as an electronic catalog. The generated intent-aware user interfaces can be provided to users in "real time." For example, a user interface provided in real time can be generated and then displayed to a user as the user is interacting with the electronic catalog, such as when the user navigates to a new page of the catalog.

Execution Environment

Figure 4:
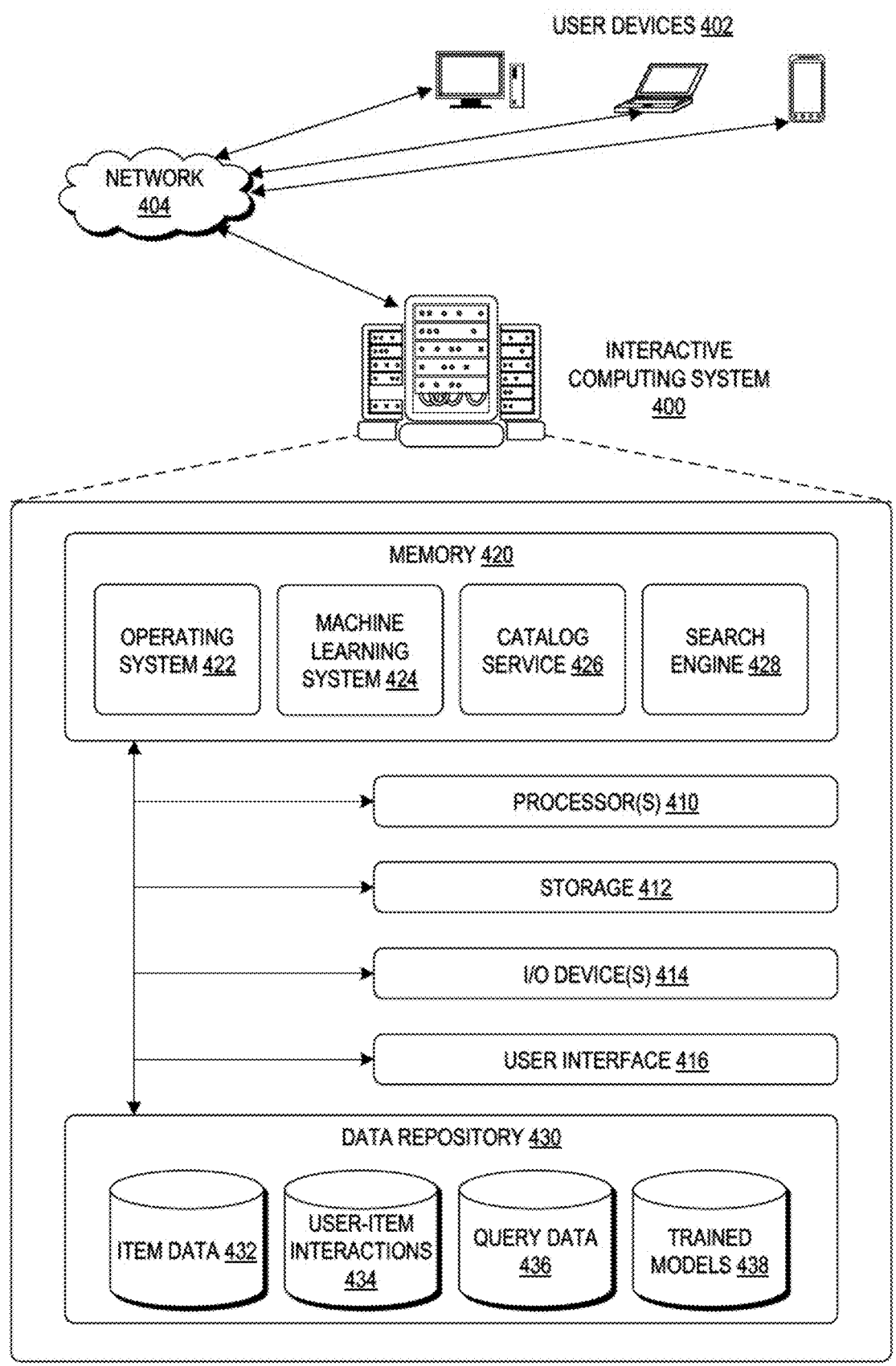
FIG. 4 is a block diagram of an illustrative computing system configured to implement the processes of FIGS. 2 and 3 to generate a user interface, for example the user interface of FIG. 1C.

FIG. 4 is a block diagram of an illustrative interactive computing system 400 configured to implement the machine-learning based intent-aware user interface generation described above with respect to FIGS. 1A, 1C, 2, and 3. The architecture of the interactive computing system 400 may include a memory 420 in communication with a processor 410, which can be in direct communication with one another or distributed among computing devices within a networked computing system and in communication with each other. Components used for the architecture may depend at least in part upon the type of network and/or environment selected.

As depicted interactive computing system 400 may include one or more computers, perhaps arranged in a cluster of servers or as a server farm. The memory and processors that make up these computers may be located within one computer or distributed throughout many computers (including computers that are remote from one another) as detailed herein. These servers may be configured to train artificially intelligent machine learning models to perceive user intent and manage user interface generation to comport with the perceived intent. For example, the interactive computing system 400 may be configured to manage user interfaces displayed in connection with an electronic marketplace.

The interactive computing system 400 may include at least one memory 420 and one or more processing units (or processor(s)) 410. The memory 420 may include more than one memory and may be distributed throughout the interactive computing system 400. The memory 420 may store program instructions that are loadable and executable on the processor(s) 410 as well as data generated during the execution of these programs. Depending on the configuration and type of memory, the memory 420 may be volatile (such as RAM and/or non-volatile (such as read-only memory ("ROM"), flash memory, or other memory). In some examples, the memory 420 may include multiple different types of memory, such as static random access memory ("SRAM"), dynamic random access memory ("DRAM"), or ROM.

The memory can store the program instructions as a number of modules that configure processor(s) 410 to perform the various functions described herein, for example operating system 422, machine learning system 424, catalog service 426, and search engine 428. The memory 420 may include operating system 422 for interacting with the interactive computing system 400.

The machine learning system 424 can perform autolabeling of collected search query data, and prediction of attributes associated with new input search queries. One example technique for autolabeling search query data is described above with respect to FIG. 2A, and an example technique for attribute prediction is described above with respect to FIG. 3. The machine learning system 424 can label queries with a single item (e.g., "dress"), an item attribute (e.g., "red dress"), an item attribute value (e.g., "dress size=6"), a list of items of a single type (e.g., "dresses from brand X"), and/or a list of items of mixed items (e.g., "empire waist and A-line dresses").

Users can browse an electronic catalog provided by the catalog service 426 or query the search engine 428 to obtain information about electronic catalog content stored in an item data repository 432. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes (referred to herein as "catalog fields") in a hierarchy (or graph). The disclosed attributes associated with search queries can be these catalog fields. The catalog service 426 can provide functionality for users to browse the item hierarchy in addition to searching the catalog. Users can select an item represented in the hierarchy or in a list of search results to see more details about an item. In response to a user item selection, the interactive computing system 400 can provide to a user system 402 a catalog page (sometimes called an item detail page) that includes details about the selected item.

The search engine 428 allows users to search for items of the catalog service 426. In one example, the search engine 428 can use natural language processing techniques such as semantic search to identify the intent reflected in the search query 105. Semantic search seeks to improve search accuracy by understanding the searcher's intent and the contextual meaning of search query terms as they appear in the searchable dataspace, for example within the context of the electronic catalog, to generate more relevant results. Rather than merely identifying keywords within a search query, semantic search systems consider various information about a query including its context (e.g., where on a website is the search made, what was displayed prior to the search, what other searches came before the search), synonyms and meanings of search terms, auto corrections for typographical errors, to provide relevant search results. In order to understand what a user is searching for when a term is ambiguous, meaning that it can have several meanings semantic search techniques can implement word sense disambiguation to identify the most probable meaning from all possible meanings. Thus, semantic search is a data searching technique in a which a search query aims to not only find keywords, but to determine the intent and contextual meaning of the words a person is using for search.

The processor 410 may include one or more general purpose computers, dedicated microprocessors, graphics processors, or other processing devices capable of communicating electronic information and/or training complex machine learning models. Examples of the processor 410 include one or more application-specific integrated circuits ("ASICs"), for example ASICs purpose built for machine learning training and/or inference, field programmable gate arrays ("FPGAs"), digital signal processors ("DSPs") and any other suitable specific or general purpose processors. Some embodiments can use one or more graphical processing units ("GPUs") or machine-learning-optimized processors as processor(s) 410 for training and/or implementation of the disclosed machine learning models. For example, the described neural network training can require heavy computation for metrics multiplication, and a GPU or similar processor having thousands of cores capable of parallel computing can be capable of performing daily training of a neural network, for example using a massive user-item interaction database as described herein. The processor 410 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 400 may also include additional storage 412, which may include removable storage and/or non-removable storage. The additional storage 412 may include, but is not limited to, magnetic storage, optical disks, and/or tape storage. The disk drives and their associated computer-readable media may provide non-volatile storage of computer-readable instructions, data structures, program modules, and other data for the computing devices. The memory 420 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 400 may also include input/output (I/O) device(s) and/or ports 414, such as for enabling connection with a keyboard, a mouse, a pen, a voice input device, a touch input device, a display, speakers, a printer, or other I/O device.

The interactive computing system 400 may also include a user interface 416. The user interface 416 may be provided over the network 404 to user devices 402 and utilized by a user to access portions of the interactive computing system 400. In some examples, the user interface 416 may include a graphical user interface, web-based applications, programmatic interfaces such as application programming interfaces ("APIs"), or other user interface configurations. The user interface 416 can be modified as described herein to reflect intent-aware attribute selections and/or intent-aware filtered recommendation sets.

The interactive computing system 400 may also include a data store 430. In some examples, the data store 430 may include one or more data stores, databases, data structures, or the like for storing and/or retaining information associated with the interactive computing system 400. Thus, the data store 430 may include data structures, such as an item data repository 432, user interaction data repository 434, query data repository 436, and trained models data repository 438. The trained models data repository 526 can include the parameters of machine learning models trained as described herein.

The item data repository 432 comprises one or more physical data storage devices that stores data representing the items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog. The item data repository 432 also stores data representing item attributes. Item attributes represent characteristics of these items, for example category (or another node in the item hierarchy), brand, gender (e.g., whether the item is typically considered as suitable by males, females, or gender-neutral), target age-range (e.g., baby, child, adult), price, keywords, user ratings, delivery timeframe, product origin, and other item attributes presented herein, to name a few non-limiting examples.

The catalog service 426 can access electronic catalog or other item data from item data repository 432. The items can be associated with one or more nodes in a hierarchical catalog structure, with a general "items" (e.g., all products) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category (e.g., is connected by an edge to a broader category node), which is in turn part of a broader category still, and so on, up and until the root node. While the terms "browse node," "browse category," and "category" are often used interchangeably herein, it should be understood that categories can be arranged in a flat structure instead of a hierarchical structure in some embodiments.

The user interaction data repository 434 comprises one or more physical data storage devices that stores logged user behaviors with respect to representations of items within a network environment ("item interactions") together with time data for the events. Interactions can also include user selection of catalog browse nodes and/or search refinement options, and item attribute value selections/inputs. The time data for the events can be a timestamp or other suitable date/time indicator, and can be used to generate item interaction timelines. Each of the item interactions and associated time data may be stored in, and maintained by, the user interaction data repository 434 with respect to a timeline for a particular user or aggregate group of users. Portions of these timelines can be associated with particular search queries. For example, user interactions occurring after a search until purchase of an item matching the intent of the search (or addition of said item to a digital cart, wish list, or registry) can be associated with a search. As another example, user interactions occurring before a search can be associated with that search if they relate to the intent of the search, for example in the scenario of a user submitting multiple related search queries and browsing items in response to each query. Item user interaction data repository 434 can, for example in the ecommerce context, include item purchase histories, item viewing histories, item add histories (for example adding an item to a cart without subsequently purchasing the item or adding the item to a wish list or registry), item sharing, item ratings, item reviews, and the like. Outside of the ecommerce context an item can be a network page or web site visited by a user, a digital advertisement selected by a user, or other types of interactive digital content. In some embodiments, an item interaction event may include an identifier for the item (for example, an item number, stock keeping unit (SKU), etc.), an indication of the type of interaction, or any other suitable information.

The query data repository 436 comprises one or more physical data storage devices that stores search queries and associated time data. As described herein, search queries can include one or more words and/or phrases. The search queries can be semantically parsed, and any attributes identified during the semantic parse can be stored in association with the query, for example for use in training machine learning models as described herein.

The trained models data repository 438 comprises one or more physical data storage devices that stores the parameters of machine learning models trained as described herein. For example, the trained models data repository 438 can store the parameters of a search intent prediction model trained according to the process 200.

The interactive computing system 400 can communicate over network 404 with user devices 402. The network 404 can include any appropriate network, including an intranet, the Internet, a cellular network, a local area network or any other such network or combination thereof. User devices 402 can include any network-equipped computing device, for example desktop computers, laptops, smartphones, tablets, e-readers, gaming consoles, and the like. Users can access the interactive computing system 400 and interact with items therein via the network 404 and can be provided with recommendations via the network 404.

Overview of Example End-to-End Use Case

Below is an example of one end-to-end use case of the disclosed techniques for generating intent-aware user interfaces in the context of an electronic catalog.

Step one involves query data collection. For example, electronic catalog users enter queries for "red dress" or other similar searches (e.g., "red gown," "scarlet dress," and other queries involving synonyms of "red" and/or "dress"). In response to these queries, the users are served user interfaces displaying search results including a number of different items responsive to their queries. The users interact with various red dresses that are returned in the search results (e.g., by selecting to view their detail pages, adding them to wish lists or shopping carts, sharing them, or purchasing them). These red dresses are each associated with a number of different attribute-value pairs, for example {attribute=color, value=red} and {attribute=apparel, value=dress}

Step two involves offline autolabeling of training data. The autolabeling component of the machine learning system 424 maps these natural-language queries into a formal representation of their meaning within the catalog. This is done by: (i) analyzing the interaction data to identify attribute-values that significantly co-occur across the items of the interactions (here, color=red and apparel=dress), (ii) mapping the attribute-values to catalog fields (e.g., nodes, refinement nodes, category nodes, etc. in the catalog hierarchy, which may each be represented by a unique ID), and (iii) labelling the query with these catalog fields. This results in the query of "red dress" being autolabeled (labeled programmatically without requiring human oversight) with the unique IDs for the catalog fields for color=red and apparel=dress Step three involves offline model training. The machine learning system 424 includes a suitable machine learning model (e.g., sequence to sequence model, transformer network) for predicting catalog fields from input queries. The machine learning model is trained such that its internal parameters are able to predict the catalog fields from the query (natural language query=input data, catalog fields=expected output data). This can be done using aggregate user behavioral data to create a general model (as in the present example) or using an individual user's interaction history (for more personalized recommendations).

Step four involves online recommendation generation. A user enters the search query "red dress," "dress red," "red gown," or other similar searches via search engine 428 and is returned a search results user interface displaying a number of items (see FIG. 1A for an example). The machine learning system 424 uses the trained model to perform a semantic parse of the query. The output of the model identifies the predicted catalog fields that represent the meaning of the natural language query within the context of the electronic catalog. These catalog fields define the predicted "mission" or "intent" of the user.

When the user transitions from the search results user interface 100 to the detail page 120 for one of the items, any recommended items shown on that page are filtered to match the determined intent of the user. For example, a set of recommended items associated with the item of the detail page can be filtered to only display items that fall within the identified catalog fields. The recommendations may also be presented with an indication that ties back to the initial query, e.g., "humans who viewed this also viewed these other red dresses." Further, any user-selectable menus on the item detail page relating to the attributes in the query can be pre-selected with the values of the query. For example, if the user selects to view the detail page of a dress that is available in black and red, the option of "red" can be automatically selected based on the user's query.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially. Certain described tasks may be implemented by processors that are remote from one another, for example in separate server towers and/or geographically remote. All of the data elements described herein as generated or learned by the system can be stored by the system in volatile or non-volatile computer memory (e.g., solid state memories or disk drive memory).

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a DSP, an ASIC, a FPGA or other programmable logic device, discrete gate or transistor logic, discrete hardware components, or any combination thereof designed to perform the functions described herein. A general purpose processor device can be a microprocessor, but in the alternative, the processor device can be a controller or microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   at least one data repository storing (i) item data representing a plurality of items of an electronic catalog and a plurality of catalog fields representing attributes of the plurality of items, (ii) queries submitted by a user of the electronic catalog, and (iii) data representing historical interactions between the user and particular ones of the plurality of items;
   a memory storing computer executable instructions; and
   at least one processor configured by the executable instructions to at least:
   map particular queries to particular interactions of the historical interactions,
   generate training data by autolabeling at least some of the queries with one or more corresponding catalog fields of the plurality of catalog fields, wherein the one or more corresponding catalog fields for a particular query are identified based on particular catalog fields associated with historical interactions mapped to the particular query and on particular catalog fields associated with terms of the query, train a machine learning model using the training data to predict catalog fields from search queries, receive a search query submitted by a user, the search query comprising text entered by the user into a search field of a search interface;

use the trained machine learning model to predict that at least one catalog field of the plurality of catalog fields corresponds to the search query, output a first user interface displaying search results of the search query, wherein the search results include items associated with the at least one catalog field, and in response to the user navigating from the first user interface to a catalog page for a selected item in the search results:

look up a set of items related to the selected item in the search results, the related items determined to be related to the selected item based at least partly on an analysis of logged item interactions of a plurality of users, filter the set of related items to remove one or more related items that do not match the at least one catalog field, and output a second user interface displaying the catalog page with the filtered set of related items, whereby the related items presented on the catalog page are dependent upon the search query used to locate said catalog page;

wherein the at least one catalog field corresponding to the search query comprises a color field specifying an item color, and wherein the at least one processor, in filtering the set of related catalog items, is configured to filter out a related catalog item based on a determination that the related catalog item is not available in said item color.

2. The system of claim 1, wherein the at least one processor is configured by the executable instructions to at least:

generate the training data and train the machine learning model in an offline mode; and use the trained machine learning model in an online mode.

3. The system of claim 1, wherein the at least one processor is configured by the executable instructions to at least:

supplement the training data with manually-labeled training data, wherein the manually-labeled training data indicates a search query word and a corresponding item-ranking technique;

identify the search query word in the search query input by the user; and use the item-ranking technique to sort the results of the search query.

4. The system of claim 1, wherein the machine learning model comprises one of a sequence to sequence model and a transformer network.

5. A computer-implemented method comprising, by a computing system comprising one or more processors:

generating training data by, for particular queries submitted by a user of an electronic catalog:

mapping a particular query to particular interactions of historical interactions between particular users and particular ones of a plurality of items of the electronic catalog, identifying at least a first catalog field associated with the historical interactions mapped to the particular query;

identifying at least a second catalog field associated with terms of the particular query, wherein the first and second catalog fields belong to a set of a plurality of catalog fields representing attributes of the plurality of items, and autolabeling the particular query with the first and second catalog fields;

training a machine learning model using the training data to predict catalog fields of the plurality of catalog fields from search queries;

receiving a search query submitted by a user, the search query comprising text entered by the user into a search field of a search interface;

using the trained machine learning model to predict that at least one catalog field corresponds to the search query;

generating, and outputting for display to the user, a search results page that lists a plurality of catalog items that are responsive to the search query; and in response to user selection of a catalog item on the search results page:

looking up a set of related catalog items that are related to the selected catalog item, said related catalog items determined to be related to the selected catalog item based at least partly on recorded item interactions of a plurality of users;

filtering the set of related catalog items to remove one or more related catalog items that do not correspond to the at least one catalog field; and generating, and outputting for display to the user, a catalog page for the selected catalog item, the catalog page including a description of the selected catalog item and including a recommendations section that displays the filtered set of related catalog items, whereby the related catalog items displayed in the recommendations section depend upon the search query used to locate the selected catalog item;

wherein the at least one catalog field corresponding to the search query comprises a color field specifying an item color, and wherein filtering the set of related catalog items comprises filtering out a related catalog item based on a determination that the related catalog item is not available in said color.

6. The computer-implemented method of claim 5, further comprising:

generating the training data and training the machine learning model in an offline mode; and using the trained machine learning model in an online mode.

7. The computer-implemented method of claim 5, further comprising:

supplementing the training data with manually-labeled training data, wherein the manually-labeled training data indicates a search query word and a corresponding item-ranking technique;

identifying the search query word in the search query input by the user; and using the item-ranking technique to sort the results of the search query.

8. The computer-implemented method of claim 5, further comprising constructing a representation of a mission of the user based on the one or more catalog fields, the mission representing at least one item that, if acquired by the user, satisfies an intent inherent in the search query.

9. The computer-implemented method of claim 8, further comprising ceasing filtering the items displayed in response to determining that the user has completed the mission by acquiring an item corresponding to the one or more catalog fields.

10. The computer-implemented method of claim 8, further comprising ceasing filtering the items displayed in response to determining that the user has abandoned the mission.

11. A computer-implemented method comprising, by a computing system comprising one or more processors:
generating training data by, for particular queries submitted by a user of an electronic catalog:
mapping a particular query to particular interactions of historical interactions between particular users and particular ones of a plurality of items of the electronic catalog,
identifying at least a first catalog field associated with the historical interactions mapped to the particular query;
identifying at least a second catalog field associated with terms of the particular query, wherein the first and second catalog fields belong to a set of a plurality of catalog fields representing attributes of the plurality of items, and
autolabeling the particular query with the first and second catalog fields;
training a machine learning model using the training data to predict catalog fields of the plurality of catalog fields from search queries;
receiving a search query submitted by a user, the search query comprising text entered by the user into a search field of a search interface;
using the trained machine learning model to predict that at least one catalog field corresponds to the search query;
generating, and outputting for display to the user, a search results page that lists a plurality of catalog items that are responsive to the search query; and
in response to user selection of a catalog item on the search results page:
looking up a set of related catalog items that are related to the selected catalog item, said related catalog items determined to be related to the selected catalog item based at least partly on recorded item interactions of a plurality of users;
filtering the set of related catalog items to remove one or more related catalog items that do not correspond to the at least one catalog field; and
generating, and outputting for display to the user, a catalog page for the selected catalog item, the catalog page including a description of the selected catalog item and including a recommendations section that displays the filtered set of related catalog items, whereby the related catalog items displayed in the recommendations section depend upon the search query used to locate the selected catalog item;
wherein the at least one catalog field corresponding to the search query comprises a size field specifying an item size, and wherein filtering the set of related catalog items comprises filtering out a related catalog item based on a determination that the related catalog item is not available in said item size.

12. A non-transitory computer-readable medium storing instructions that, when executed by a computing system comprising one or more processors, cause the computing system to perform operations comprising:
receiving a search query input by a user, said search query comprising text entered by the user into a search field of a search interface;
training a machine learning model to translate search queries into catalog fields representing attributes of a plurality of items of an electronic catalog;
predicting that at least one catalog field is associated with the search query by providing the search query as input to the machine learning model, wherein the at least one catalog field corresponding to the search query comprises a color field specifying an item color;
generating, and outputting for display to the user, a search results page that lists a plurality of catalog items that are responsive to the search query; and
in response to user selection of a catalog item on the search results page:
looking up a set of related catalog items that are related to the selected catalog item;
filtering the set of related catalog items to remove one or more related catalog items that do not correspond to the at least one catalog field, wherein filtering the set of related catalog items comprises filtering out a related catalog item based on a determination that the related catalog item is not available in said color; and
generating, and outputting for display to the user, a catalog page for the selected catalog item, the catalog page including a description of the selected catalog item and including a recommendations section that displays the filtered set of related items, whereby the related catalog items displayed in the recommendations section depend upon the search query used to locate the selected catalog item;
wherein the recommendations section comprises, for each related catalog item, a respective hyperlink to a catalog page corresponding to the related catalog item, said hyperlinks providing navigational shortcuts to the catalog pages corresponding to the related catalog items.

13. The non-transitory computer-readable medium of claim 12, wherein the computer-readable medium further includes instructions that, when executed, cause the computing system to perform operations comprising:
constructing a representation of a mission of the user based on the one or more catalog fields, the mission representing at least one item that, if acquired by the user, satisfies an intent inherent in the search query; and
as the user navigates to additional catalog pages following submission of the search query, customizing the additional catalog pages to correspond to the mission until the user completes or abandons the mission.

14. The non-transitory computer-readable medium of claim 12, wherein the machine learning model comprises one of a sequence to sequence model and a transformer network.

15. The non-transitory computer-readable medium of claim 12, wherein the computer-readable medium further includes instructions that, when executed, cause the computing system to perform operations comprising:
generating training data by, for particular queries submitted by the user:
mapping a particular query to particular interactions of historical interactions between the user and particular ones of the plurality of items of the electronic catalog,
identifying one or more catalog fields that are associated with one or both of the historical interactions mapped to the particular query and the terms of the query, and autolabeling the particular query with the one or more catalog fields; and using the training data to train the machine learning model.

16. A non-transitory computer-readable medium storing instructions that, when executed by a computing system comprising one or more processors, cause the computing system to perform operations comprising:

receiving a search query input by a user, said search query comprising text entered by the user into a search field of a search interface;

training a machine learning model to translate search queries into catalog fields representing attributes of a plurality of items of an electronic catalog;

predicting that at least one catalog field is associated with the search query by providing the search query as input to the machine learning model;

generating, and outputting for display to the user, a search results page that lists a plurality of catalog items that are responsive to the search query; and in response to user selection of a catalog item on the search results page:

looking up a set of related catalog items that are related to the selected catalog item;

filtering the set of related catalog items to remove one or more related catalog items that do not correspond to the at least one catalog field; and generating, and outputting for display to the user, a catalog page for the selected catalog item, the catalog page including a description of the selected catalog item and including a recommendations section that displays the filtered set of related items, whereby the related catalog items displayed in the recommendations section depend upon the search query used to locate the selected catalog item;

wherein the recommendations section comprises, for each related catalog item, a respective hyperlink to a catalog page corresponding to the related catalog item, said hyperlinks providing navigational shortcuts to the catalog pages corresponding to the related catalog items;

wherein the at least one catalog field corresponding to the search query comprises a size field specifying an item size, and wherein filtering the set of related catalog items comprises filtering out a related catalog item based on a determination that the related catalog item is not available in said item size.

17. A system comprising:

at least one data repository storing (i) item data representing a plurality of items of an electronic catalog and a plurality of catalog fields representing attributes of the plurality of items, (ii) queries submitted by a user of the electronic catalog, and (iii) data representing historical interactions between the user and particular ones of the plurality of items;

a memory storing computer executable instructions; and at least one processor configured by the executable instructions to at least:

map particular queries to particular interactions of the historical interactions, generate training data by autolabeling at least some of the queries with one or more corresponding catalog fields of the plurality of catalog fields, wherein the one or more corresponding catalog fields for a particular query are identified based on particular catalog fields associated with historical interactions mapped to the particular query and on particular catalog fields associated with terms of the query, train a machine learning model using the training data to predict catalog fields from search queries, receive a search query submitted by a user, the search query comprising text entered by the user into a search field of a search interface;

use the trained machine learning model to predict that at least one catalog field of the plurality of catalog fields corresponds to the search query, output a first user interface displaying search results of the search query, wherein the search results include items associated with the at least one catalog field, and in response to the user navigating from the first user interface to a catalog page for a selected item in the search results:

look up a set of items related to the selected item in the search results, the related items determined to be related to the selected item based at least partly on an analysis of logged item interactions of a plurality of users, filter the set of related items to remove one or more related items that do not match the at least one catalog field, and output a second user interface displaying the catalog page with the filtered set of related items, whereby the related items presented on the catalog page are dependent upon the search query used to locate said catalog page;

wherein the at least one catalog field corresponding to the search query comprises a size field specifying an item size, and wherein the at least one processor, in filtering the set of related catalog items, is configured to filter out a related catalog item based on a determination that the related catalog item is not available in said item size.

\* \* \* \* \*